United States Patent [19]

Williams et al.

[11] 4,396,734

[45] Aug. 2, 1983

[54] POLYMER STABILIZERS

[75] Inventors: Earl P. Williams, Pen Argyl, Pa.; Donald H. Lorenz, Basking Ridge, N.J.

[73] Assignee: GAF Corporation, New York, N.Y.

[21] Appl. No.: 245,851

[22] Filed: Mar. 20, 1981

[51] Int. Cl.$^3$ ............................................... C08K 5/23
[52] U.S. Cl. ...................................... 524/89; 524/190; 524/205; 524/237; 524/548; 524/549; 524/556
[58] Field of Search ............... 260/29.6 HN, 29.6 N, 260/29.6 Z, 29.6 MN, 29.6 MQ, 42.21; 106/22, 23; 524/89, 190, 205, 549, 548

[56] References Cited

U.S. PATENT DOCUMENTS

| | | | |
|---|---|---|---|
| 3,906,513 | 9/1975 | Siegelman | 106/22 |
| 4,066,595 | 1/1978 | Bunge | 260/29.6 MN |
| 4,163,001 | 7/1979 | Carumpalos | 260/29.6 N |
| 4,197,087 | 4/1980 | Ami | 260/42.21 |
| 4,205,998 | 6/1980 | Becker | 260/29.6 MN |
| 4,225,475 | 9/1980 | Carumpalos | 260/29.6 N |
| 4,248,636 | 2/1981 | Sasaki | 106/22 |

*Primary Examiner*—Paul R. Michl
*Attorney, Agent, or Firm*—Marilyn J. Maue; J. Gary Mohr; Joshua J. Ward

[57] ABSTRACT

Polymer thickeners having a viscosity of at least 10 K, employed in acid media are stabilized with Redox indicators having from 6 to 30 carbon atoms, such as, for example, methylene blue, phenosafranine, pyronine Y, tartrazine, amaranth, methyl orange, an alkali metal salt of diphenylamine sulfonate and malachite green oxalate, which stabilizers are combined with the polymer in a concentration of between about 0.005 to about 1 weight %.

19 Claims, No Drawings

POLYMER STABILIZERS

In the one aspect, this invention relates to novel polymer stabilizers for use in an acidic environment. In another aspect, the invention relates to the composition of a stabilized hydrophilic or water-swellable polymer such as vinyl polymers, copolymers, interpolymers in an acid medium, which may or may not be cross-linked, to guarantee the acidic mucilages of said polymers against viscosity decrease and graining.

Acid solutions have long been employed in a variety of applications including acid pickling, etching, oil well rock fracturing, scale and stain removal solutions, paint strippers, metal preconditioners for painting and rust removal, etc. However, the acid solutions generally require the addition of thickeners to improve their application and sustain their effect on the applied substrate. Polymers have been recommended to provide the increased viscosity desired; however, many excellent polymer thickeners are disqualified for this application because of instability by attack of the acid on their molecular structures or by oxidative or photochemical degradation. When polymer degradation occurs, the polymeric thickener is not retained in solution and the viscosity rapidly declines.

Although polyvinyl pyrrolidone is stable to acid attack, some loss of effectiveness on storage of the acidic solutions is caused by oxidative and/or photochemical degradation. Additionally, aqueous gels of polyvinyl pyrrolidone tend to become grainy on aging so that non-uniform applications of the acid medium result. Most other polymer thickeners are unstable in strong acid solution and rapidly loose thickening effectiveness over a period of several weeks to several months in storage, so that although these polymers form excellent mucilages, gels, emulsifying and suspending agents when freshly prepared, they have the disadvantage of requiring immediate use.

Accordingly it is an object of the present invention to provide stabilizers for the polymeric thickeners which extend their stability for several years.

It is another object of this invention to provide economical stabilizers for combination with the polymer thickeners, which in themselves contribute to the increase in viscosity of the acid solutions.

Another object is to provide a novel composition comprising an aqueous solution having a pH less than 7 and containing acid, polymeric thickener and stabilizer.

Still another object is to provide a stabilized vinyl polymer for use in any acidic environment.

These and other objects will become apparent from the following description and disclosure.

The above objects are accomplished by preparing an acidic solution containing between about 0.5 and about 25 weight % of a polymer thickener and an effective quantity of the stabilizing ingredient, generally in the range of from about 0.005 to about 1 weight %, preferably from about 0.05 to about 0.75 weight %, based on the dry polymer by stirring the composition until a uniform mixture is achieved. The stabilizer, which is a redox indicator having from 6 to 30 carbon atoms, can be added to the mixture of polymer in the acid medium or the stabilizing agent, in the above amount, can be added directly to the dry polymer before introduction of the acidic liquid. The incorporation of ingredients is generally carried out at a temperature above the freezing point of the liquid up to about 100° C. for a period of from about 1 to about 60 hours or until a homogeneous mixture is achieved, under atmospheric pressure. The formulating conditions preferably employed include mixing at ambient temperature and pressure for a period of from about 4 to 50 hours.

The vinyl polymers of the present invention, which may be employed as thickeners in acid media, are water soluble or water swellable polymers and include poly-N-vinyl-2-pyrrolidone; vinyl alkyl ether/maleic anhydride copolymers; vinyl-2-pyrrolidone/vinyl alkyl ether copolymers wherein the alkyl moiety contains from 1 to 3 carbon atoms, the lower alkyl esters of said vinyl ether/maleic anhydride copolymers, and the cross-linked polymers and interpolymers of the above.

Preferably the polymers of the present invention are of relatively high molecular weight. The preferred polymers are homopolymers of N-vinyl-2-pyrrolidone, e.g. K 90 and K 112; and methyl vinyl ether/maleic anhydride copolymer.

Also certain water-soluble or water-swellable co- or ter-polymers and their esters, salts and amides are desirable viscosity stabilizers for the mucilages of the present invention. These polymers may be of the block, alternating or statistical type. The terpolymers may incorporate monomers having a higher molecular weight, e.g., higher alkyl vinyl ethers such as octadecyl vinyl ether, butyl vinyl ether and octyl vinyl ether monomers, provided that the amount incorporated does not destroy the water-solubility or water-swellability of the final polymer. Interpolymers of this group include dicarboxylic acid anhydride and vinyl ether monomers optionally containing a cross-linking agent. Specifically indicated are the dicarboxylic acid anhydrides having the general structure:

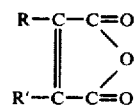

wherein R and R' are selected from the group consisting of hydrogen, halogen, cyano, alkyl, aryl, alkaryl, aralkyl and cycloaliphatic groups. Illustrative anhydrides include maleic anhydride, chloromaleic anhydride, 2,3-dichloromaleic anhydride, 2,3-dicyano maleic anhydride, 2,3-dimethyl maleic anhydride, 2,3-diphenyl maleic anhydride, 2,3-dibenzyl maleic anhydride, 2,3-di(p-methylphenyl)maleic anhydride, 2,3-dicyclohexyl maleic anhydride, 2-methyl maleic anhydride, 2-ethyl maleic anhydride, 2-cyano maleic anhydride, 2-propyl maleic anhydride, 2-phenyl-, 2-benzyl-, 2(p-methylphenyl-) and 2-cyclohexyl-maleic anhydrides. Maleic anhydride is preferred because of its ready availability and comparatively low cost. The poly-basic acid moieties of the polymers of this invention are those which result from the hydrolysis of the anhydride linkage of the above anhydrides.

The vinyl ether monomers include vinyl methyl ether, vinyl ethyl ether, vinyl propyl ether, vinyl isopropyl ether, vinyl butyl ethers, vinyl hexyl ethers, vinyl 2-ethylhexyl ethers and vinyl octyl ethers. The ethers in which the alkyl group has from 1 to 4 carbon atoms are preferred. Among the most preferred class of vinyl ethers are methyl vinyl ether, ethyl vinyl ether, propyl vinyl ethers, and the butyl vinyl ethers.

The third monomeric material, which is optional, is a cross-linking agent which contains a plurality of polymerizable CH₂=C< groupings and which is copolymerizable with the alpha-beta unsaturated acid anhydride and the vinyl alkyl ether monomers to form cross-linked water-swellable terpolymers. Illustrative cross-linking agents include the polyunsaturated hydrocarbons such as divinyl benzene, divinyl naphthalene, divinyl cyclohexane, low molecular weight polymerized dienes such as polybutadiene and other conjugated diene polymers having substantial unsaturation remaining in the molecule; unsaturated sulfones such as hexaallyl trimethylene trisulfone; unsaturated amides such as trimethylacrylyl triazine; di- and polyunsaturated esters such as ethylene glycol diacrylate, allyl acrylate, allyl cinnamate, diallyl maleate, diallyl phthalate, diallyl malonate, etc.; polyunsaturated acids such as beta-styryl acrylic acid, etc.; polyunsaturated anhydrides such as acrylic anhydride, methacrylic anhydride, etc.; polyunsaturated ethers such as divinyl ether, diallyl ether, diallyl ethylene glycol ether, 1,4,5,8-naphthalene tetrol ethers, the vinyl, allyl, methallyl and crotyl polyethers containing 2 to 7 or more alkenyl ether groups per molecule; polyunsaturated ketones such as divinyl ketone and diallyl ketone; and polyunsaturated compounds containing one or more functional groups such as the half ethers, allyl-beta-allyoxy propionate and allyl methacrylyl sucrose, the half ester monoallyl maleate, the partial ethers of polyhydric alcohols such as diallyl glycerol ether, polyallyl sucrose, polyallyl glycose and other polyallyl derivatives of carbohydrates and polyalcohols, including polyallyl sorbitol, polyallyl mannitol and other polyallyl ethers of sugar-derived alcohols. The carbohydrate polyallyl ethers usually contain 3 or more allyl groups in each molecule.

The preferred class of cross-linking agents are the polyunsaturated hydrocarbons, solvent soluble polymeric open-chain aliphatic conjugated dienes, and the polyalkenyl polyethers of polyalcohols containing at least 4 carbon atoms and at least 3 hydroxyl groups. All of these preferred cross-linking agents must contain a plurality of polymerizable CH₂=C< groups, the double bond of which are not in conjugated relationship one with the other. Specific examples of the latter include polyallyl glucose, polyallyl sucrose, polyallyl levulose, polyallyl erythritol, polyallyl pentaerythritol, polyallyl sorbitol, polyallyl mannitol and the polyallyl disaccharides. The amount of cross-linking agent can vary from about 0.1% to about 10% of the combined weight of the remaining monomers.

Maleic acid anhydride and its substituted derivatives tend to form alternating copolymers with most other monomers with which they are copolymerizable. Therefore, substantially molar equivalents of the anhydrides and alkyl vinyl ethers should be used in preparing the cross-linked polymer. If desired, however, up to about 20% of the total monomeric mixture can consist of other monoolefinic monomers such as styrene, acrylonitrile, vinyl chloride, vinylidene chloride, vinyl acetate, vinyl benzoate, diethyl maleate, ethylene, isobutylene or acrylic acid. In preparing cross-linked polymers, it is preferred to use only the essential monomeric materials described heretofore, namely, a maleic anhydride, a vinyl alkyl ether and a cross-linking agent.

Both the cross-linked and non-cross-linked polymers can be converted to partial esters, partial amides or salts by reaction with a primary or secondary alcohol, ammonia or a primary or secondary amine or an inorganic metallic alkaline material. Representative alcohols are preferably aliphatic types having from 1 to about 18 carbon atoms. The amines may be either aliphatic or aromatic and must have at least one replaceable hydrogen on the amine nitrogen. The number of carbon atoms in the amine can vary from 1 to 18. The preferred salt forming groups are those of the alkali metals.

All of the above polymers are well known and most have been added as thickeners to acid solutions for viscosity improvement therein. The viscosity range of these polymers varies widely depending upon the ultimate use of the acid solution. For example, in general the polymer viscosity K-value varies from about 10 to 250 K, more desirably from about 15 to about 150 K.

Other polymers which can be employed in the operation of the present invention include: polyethylene oxide, polypropylene oxide, polyacrylic acid, polymethacrylic acid, sulfated polyvinyl alcohol, polystyrene sulfonate, hydrolyzed polyacrylonitrile, polyacrylamide, copolymers of maleic anhydride with styrene, isobutylene, or ethylene, copolymers of acrylic acid with N-vinylpyrrolidone and methylvinylpyridine, vinylacetate/maleic anhydride copolymers, poly(vinyl alcohol), polymers of caprolactams, e.g. poly(N-vinylcaprolactam) and their copolymers and interpolymers which comprise nylon. The polymer can be in the form of a dry powder or liquid, depending upon its natural physical state.

The acids suitably employed to provide the acidic solutions of the present invention include mineral acids, such as hydrogen halides, phosphoric acid, nitric acid, perchloric acid, chromic acid, hypochloric acid, and sulfuric acid. Of this group, the chlorine containing acids are preferred and hydrogen chloride is most preferred. Polybasic carboxylic acids, such as oxalic, tartaric, citric, adipic, fumaric, maleic and succinic acids can also be used to provide the acid media.

It should be understood that, in the present invention, the composition of the polymer and stabilizer in the absence of an acidic solution, also provides valuable compositions which may be subsequently employed in an acidic environment. Thus, the compositions of the present invention need not include the acidic solution and the stabilizer can be combined with the polymer in a dry or liquid state or both components can be mixed in an inert carrier having a pH below about 7.5. Also certain polymers e.g. methyl vinyl ether/maleic anhydride provide a hydrolyzed, acid moiety which imparts an acid character to aqueous solutions. In these cases, the separate addition of an acid is unnecessary.

The stabilizers of the present invention comprise a group of redox indicators having from 6 to 30 carbon atoms and containing a nitrogen radical selected from the group consisting of amino, azo and cyano; preferably having from 10 to 26 carbon atoms. These compounds retard oxidation of the polymers in an acid environment and stabilize their structures so as to minimize viscosity loss or, in some cases, increase the viscosity of an acid solution. Compounds representative of this group include methylene blue, pyronine, phenosafranine, malachite green oxalate, the sodium salt of diphenylamine sulfonate, amaranth, tartrazine, methyl orange, methyl green, methyl red, neutral red; gallocyanine; o-tolidine; xylene cyanole; dimethylglyoxine; tionine; N-phenyl-1,2,4-benzenetriamine; N,N-dimethyl-p-phenylenediamine; diphenylamine; N,N-diphenylbenzidine; 3,3-dimethoxybenzidine and the dihydrochloride salt thereof; barium or sodium diphenylamine sulfonate; 1,10-phenanthroline optionally substituted with from 1 to 4 methyl or phenyl groups and the corresponding nitro, iron, sulfate, monochloride or perchlorate derivatives thereof; N-phenanthranilic acid; 4,7-diphenyl-1,10-phenanthroline disulfonic acid disodium salt; bipyridine and its monohydrochloride, ruthenium chloride or iron perchlorate derivatives; terpyridine; picoline and its iron perchlorate derivative; methyl red hydrochloride; the sodium salt of 2,6-dichloroindophenol; 4,4-bis(sulfophenyl)amino]-2,2-biphenyldisulfonic acid tetrasodium salt; and diphenylamine. Of this group, the methylene blue; methyl-red, orange and green; pyronine Y; basic blue; neutral red; phenosafranine; malachite green oxalate; amaranth, tartrazine and sodium diphenylamine sulfonate indicators are most preferred.

The precise amount of stabilizer employed may vary somewhat depending on the conditions under which the polymer containing solution or mucilage is prepared. For example, when a relatively strong acid solution is employed, it is recommended that an amount above 0.05 weight % of the stabilizer based on the polymer be used in the formulation. In weaker acid solutions, containing larger amounts of polymer, as little as 0.005 weight % of the stabilizer can be used effectively.

Many of the present stabilizers impart a color to the acid solution, which does not vary in shade or in hue as long as no polymer degradation occurs. Consequently, these stabilizers provide an additional advantage as visual stabilization indicators for the acidic compositions. This function is particularly useful when the acid solutions are to be stored over an extended period of time and for setting use dates on stored inventories.

Having generally described the invention, reference is now had to the accompanying examples which illustrate preferred embodiments but which are not to be construed as limiting to the scope of the present invention which is more broadly defined in the foregoing disclosure and in the accompanying claims. In the following examples, all amounts are by weight unless otherwise indicated.

EXAMPLES 1 THROUGH 32

Stabilizers for Hydrolyzed Gantrez AN Polymer

The polymer Gantrez AN-119 is a copolymer of methyl vinyl ether and maleic anhydride 50/50 (K approximately 18-43). Gantrez AN-169 is a similar copolymer but of higher viscosity (K approximately 84-92). Both are supplied by GAF Corporation.

In each of the following examples, a total of 100 grams of materials including water, dry polymer solids and stabilizer (previously made up as a 1% aqueous solution) were charged to a 4 ounce widemouth bottle and rotated (3.5 RPM) for 48 hours at ambient temperature, during which time the anhydride portion of the polymer was hydrolyzed and thoroughly mixed with the stabilizer. The pH of the hydrolyzed materials ranged from 0.1 to 1.9. Brookfield viscosities (RVT) were determined directly in the bottle.

Gantrez polymer grades AN-119 and 169 were tested at polymer concentrations of 5, 10 or 20%. It was noted that without benefit of added stabilizers, the percent decrease in viscosity is greater for the higher molecular weight polymer (169). Solutions of Gantrez AN-169, after storage for 130 days were found to retain only from 2.4 to 17.7% of their original viscosity, whereas, Gantrez AN-119 solutions retained from 60 to 69% in the same period.

Comparison of relative effectiveness of the stabilizers tested with the polymer are reported in Table I. Malachite green, in the 130 day test at 0.1% concentration (based on the weight of polymer) resulted in retention of 77% of the original viscosity of a 10% solution of AN-169 and 96% retention for a 10% solution of AN-119. (Examples 1, 2, 23 and 24).

The colors of the various Gantrez AN solutions all remained unchanged for the duration of these tests. The colors formed through use of these stabilizers were as follows: malachite green-bluish green; methylene blue-blue; sodium diphenylamine sulfonate-pale yellow; pyronine Y-red; amaranth-red; tartrazine-red; phenosafranine-violet.

The variations in initial viscosity of unstabilized thickened solutions (Examples 9, 11, 15 and 17 and Examples 21, 23, 28 and 31) is caused by variations in molecular weights of differing lots of polymers employed. In these Examples, the acid moiety of the hydrolyzed methyl vinyl ether/maleic anhydride copolymer was the acid which provided the acidic medium having a pH of 0.1 and 1.9.

TABLE 1

| | STABILIZERS FOR HYDROLIZED POLY(METHYL VINYL ETHER/MALEIC ANHYDRIDE) | | | | | | |
|---|---|---|---|---|---|---|---|
| Example No. | Polymer | Polymer % Concentrn. | % Stabilizer on wt. Polymer | Initial Viscosity Brookfield | Final Viscosity Brookfield | Duration of Test (Days/temp.) | Remarks |
| 1 | GANTREZ AN 119 | 10 | 0 | 49 CPS | 30 CPS | 130/ambient | Lt. yellow |
| 2 | GANTREZ AN 119 | 10 | 0.1 malachite g. | 52 CPS | 50 CPS | 130/ambient | Blue-green |
| 3 | GANTREZ AN 119 | 10 | 0 | 55 CPS | 35 CPS | 120/ambient | |
| 4 | GANTREZ AN 119 | 10 | 0.1 methylene blue | 55 CPS | 45 CPS | 120/ambient | Blue |
| 5 | GANTREZ AN 119 | 20 | 0 | 375 CPS | 225 CPS | 130/ambient | |
| 6 | GANTREZ AN 119 | 20 | 0.05 malachite g. | 375 CPS | 325 CPS | 130/ambient | |
| 7 | GANTREZ AN 119 | 20 | 0 | 375 CPS | 225 CPS | 120/ambient | |
| 8 | GANTREZ AN 119 | 20 | 0.05 methylene blue | 375 CPS | 260 CPS | 120/ambient | |
| 9 | GANTREZ AN 119 | 5 | 0 | 225 CPS | 40 CPS | 130/ambient | |
| 10 | GANTREZ AN 169 | 5 | 0.2 malachite g. | 245 CPS | 190 CPS | 130/ambient | |
| 11 | GANTREZ AN 169 | 5 | 0 | 210 CPS | 25 CPS | 120/ambient | |
| 12 | GANTREZ AN 169 | 5 | 0.2 methylene blue | 210 CPS | 140 CPS | 120/ambient | |
| 13 | GANTREZ AN 169 | 5 | 0 | 300 CPS | 30 CPS | 65/ambient | |
| 14 | GANTREZ AN 169 | 5 | 0.2 SDPAS* | 260 CPS | 200 CPS | 65/ambient | Lt. yellow |
| 15 | GANTREZ AN 169 | 5 | 0 | 250 CPS | 35 CPS | 60/ambient | |
| 16 | GANTREZ AN 169 | 5 | 0.2 Pyronin Y | 240 CPS | 150 CPS | 60/ambient | Red |
| 17 | GANTREZ AN 169 | 5 | 0 | 280 CPS | 36 CPS | 5 @ 50° C. | |
| 18 | GANTREZ AN 169 | 5 | 0.2 Amaranth | 290 CPS | 54 CPS | 5 @ 50° C. | Red |
| 19 | GANTREZ AN 169 | 5 | 0.2 Tartrazine | 270 CPS | 42 CPS | 5 @ 50° C. | Yellow |
| 20 | GANTREZ AN 169 | 5 | 0.2 Phenosafranin | 276 CPS | 150 CPS | 5 @ 50° C. | Violet |
| 21 | GANTREZ AN 169 | 10 | 0 | 4500 CPS | 110 CPS | 130/ambient | |
| 22 | GANTREZ AN 169 | 10 | 0.1 methylene blue | 4500 CPS | 2040 CPS | 130/ambient | |
| 23 | GANTREZ AN 169 | 10 | 0 | 2900 CPS | 150 CPS | 130/ambient | Lt. yellow |
| 24 | GANTREZ AN 169 | 10 | 0.1 malachite g. | 3600 CPS | 2800 CPS | 130/ambient | Blue-green |

TABLE 1-continued

STABILIZERS FOR HYDROLIZED POLY(METHYL VINYL ETHER/MALEIC ANHYDRIDE)

| Example No. | Polymer | Polymer % Concentrn. | % Stabilizer on wt. Polymer | Initial Viscosity Brookfield | Final Viscosity Brookfield | Duration of Test (Days/temp.) | Remarks |
|---|---|---|---|---|---|---|---|
| 25 | GANTREZ AN 169 | 10 | 0 | 4500 CPS | 300 CPS | 65/ambient | |
| 26 | GANTREZ AN 169 | 10 | 0.1 SDPAS* | 4900 CPS | 2700 CPS | 65/ambient | Trace yellow |
| 27 | GANTREZ AN 169 | 10 | 0.2 SDPAS* | 4200 CPS | 2500 CPS | 65/ambient | |
| 28 | GANTREZ AN 169 | 10 | 0 | 4300 CPS | 382 CPS | 60/ambient | |
| 29 | GANTREZ AN 169 | 10 | 0.1 Pyronin Y | 3800 CPS | 2000 CPS | 60/ambient | Red |
| 30 | GANTREZ AN 169 | 10 | 0.2 Pyronin Y | 3900 CPS | 2500 CPS | 60/ambient | |
| 31 | GANTREZ AN 169 | 10 | 0 | 4500 CPS | 1320 CPS | 5 @ 50° C. | |
| 32 | GANTREZ AN 169 | 10 | 0.2 Phenosafranin | 4240 CPS | 1880 CPS | 5 @ 50° C. | |

*SDPAS = Na salt of diphenylamine sulfonate

EXAMPLES 33 THROUGH 54

Stabilizers for PVP-K90

The polymer PVP-K 90 is poly(N-vinyl-2-pyrrolidone) having a viscosity K value of 90 and is supplied by GAF Corporation.

The test procedure for Examples 33–54 was similar to that described for hydrolyzed Gantrez AN (Table 1) except that in the present examples the initial viscosity was determined after only 24 hours of slow mixing. The mixtures were mixed for another 24 hours and air bubbles rose to the surface while the mixture was allowed to stand. The viscosity was then determined using a Brookfield RVT viscometer with a No. 3 spindle at 10 or 100 RPM.

Stability tests reported in following Table 2 show that aqueous concentrated solutions (10 to 15%) of unstabilized PVP-K90 increase in viscosity on storage, and in the presence or absence of light, form grainy gels within 4 to 5 months. The viscosity of a 10% solution of K90 (pH 6.8) after storage for 130 days, was found to be 221% of the initial Brookfield value (640 to 1420 cps); additionally, the original smooth mucilage appearance was transformed into a very grainy stringy gel (Example 33). This is probably due to cross-linking by oxidation or U.V. light.

In a related experiment using K 90 at 15% concentration (pH 6.8), the sample bottle was wrapped in heavy aluminum foil and stored in total darkness for 170 days. The viscosity at the end of this time was 140% that of the original viscosity (4000 to 5600 cps) and the consistency of the mucilage had changed to form a grainy stringy gel (Example 35).

Stability tests involving unstabilized PVP-K90 in 10% HCl (pH range 0.1 to 0.15) at polymer concentrations of 10 to 15% showed that, at ambient temperatures, the viscosity decreased to 55 to 60% of the original values within 90 to 95 days (Examples 39, 41 and 47).

The addition of 0.1% malachite green (based on the weight polymer) to a 6.7 pH solution in the 130 days storage test described above, was effective in reducing the viscosity increase to only 125% that of the original (vs 221% for control) and in addition completely eliminated the formation of grainy, stringy gels (Example 34). The use of as little as 0.06% methylene blue, in a 6.7 pH solution in the 170 day darkness trials, prevented any change in viscosity or appearance of the smooth mucilage (Example 36).

Another demonstration of the effectiveness of the present stabilizers was observed in Examples 43–46 conducted at 50° C. After 95 days in a constant temperature oven at 50° C., a 10% solution of unstabilized PVP-K90 in 10% HCl retained only 16% of its original viscosity (810 cps vs 130 cps). However, similar solutions containing 0.1% (based on weight K 90) of either tartrazine, amaranth of phenosafranine, retained from 78 to 92% of their original viscosities. Phenosafranine was the most effective stabilizer. Malachite green was most effective in Gantrez solutions, while pyronine is more effective in acidified PVP.

In a stabilizer concentration of from 0.066 to 0.66% methylene blue (on the weight PVP) in solutions of 15% PVP-K90 in 10% HCl, the viscosity data after 95 days at ambient temperatures showed that the unstabilized control retained only 62% of its original viscosity. The sample containing 0.066% methylene blue retained 86% of its original viscosity, while samples containing 0.13% and 0.33% remained essentially unchanged. Increasing tht levels to 0.46 and 0.66% resulted in final viscosities of 95 and 90% of the original values, respectively (Examples 47–54).

Samples of 15% PVP-K90 in 10% HCl wrapped in aluminum foil and stored in darkness for 170 days with and without methylene blue (0.06% level) demonstrated that unstabilized PVP-K90 forms a grainy gel on storage at pH 0.1. The methylene blue stabilized gel remained smooth. The unstabilized sample retained 78% of its original viscosity while the methylene blue treated sample increased in viscosity 15% (Examples 53 and 54).

Examples 38 and 39 are presented to show viscosities at lower polymer concentrations in the acid solution.

TABLE 2

STABILIZERS FOR PVP - K-90

| Example No. | K-90 % Conc. | HCl % Conc. | % Stabilizer on Wt. Poly. | Initial Viscosity | Final Viscosity | Duration of Test (Days/temp.) | Remarks |
|---|---|---|---|---|---|---|---|
| 33 | 10 | 0 | 0 | 640 CPS | 1420 CPS | 130/ambient | Grainy Gel |
| 34 | 10 | 0 | 0.1 malachite g. | 640 CPS | 800 CPS | 130/ambient | Smooth Gel |
| 35 | 15 | 0 | 0 | 4000 CPS | 5600 CPS | 170/ambient* | Grainy Gel |
| 36 | 15 | 0 | 0.066 methylene blue | 6000 CPS | 6000 CPS | 170/ambient* | Smooth Gel |
| 37 | 1 | 9.6 | 0 | 10 CPS | 5 CPS | 30/ambient | |
| 38 | 5 | 9.6 | 0 | 50 CPS | 35 CPS | 30/ambient | |
| 39 | 10 | 10 | 0 | 940 CPS | 560 CPS | 90/ambient | Clear Water White |
| 40 | 10 | 10 | 0.1 malachite g. | 910 CPS | 620 CPS | 90/ambient | Clear Orange |
| 41 | 10 | 10 | 0 | 800 CPS | 440 CPS | 90/ambient | |

TABLE 2-continued

STABILIZERS FOR PVP - K-90

| Example No. | K-90 % Conc. | HCl % Conc. | % Stabilizer on Wt. Poly. | Initial Viscosity | Final Viscosity | Duration of Test (Days/temp.) | Remarks |
|---|---|---|---|---|---|---|---|
| 42 | 10 | 10 | 0.1 Pyronin Y | 800 CPS | 1000 CPS | 90/ambient | Clear red |
| 43 | 10 | 10 | 0 | 810 CPS | 130 CPS | 95/50° C. | |
| 44 | 10 | 10 | 0.1 Amaranth | 950 CPS | 850 CPS | 95/50° C. | Clear red |
| 45 | 10 | 10 | 0.1 Tartrazine | 960 CPS | 750 CPS | 95/50° C. | Clear yellow |
| 46 | 10 | 10 | 0.1 Phenosafranin | 990 CPS | 920 CPS | 95/50° C. | Violet |
| 47 | 15 | 10 | 0 | 6500 CPS | 4000 CPS | 95/ambient | |
| 48 | 15 | 10 | 0.066 methylene blue | 7300 CPS | 6300 CPS | 95/ambient | Clear blue |
| 49 | 15 | 10 | 0.13 methylene blue | 6800 CPS | 7000 CPS | 95/ambient | |
| 50 | 15 | 10 | 0.33 methylene blue | 6300 CPS | 6400 CPS | 95/ambient | |
| 51 | 15 | 10 | 0.46 methylene blue | 6900 CPS | 6500 CPS | 95/ambient | |
| 52 | 15 | 10 | 0.66 methylene blue | 7200 CPS | 6500 CPS | 95/ambient | |
| 53 | 15 | 10 | 0 | 7300 CPS | 5700 CPS | 170/ambient* | Grainy Gel |
| 54 | 15 | 10 | 0.066 methylene blue | 6500 CPS | 7500 CPS | 170/ambient* | Smooth Gel |

*Stored in dark

EXAMPLES 55 THROUGH 87

The polymer employed in this series is poly-N-vinyl-2-pyrrolidone having a viscosity K value of 112 cross-linked with diallyl polyethylene glycol 600, (0.02 mole % cross-linked).

Methylene blue, malachite green (oxalate) sodium diphenylamine sulfonate and pyronine Y were trested as stabilizers for the polymer and the results after 2-5 months are shown in Table 3. All of these samples were tested in either 5 or 10% HCl at pH range of 0.10 to 0.18. The solution preparation employed for Examples 1-32 was employed for the present examples.

Effectiveness was noted for the present stabilizers in 2 to 5 months tests reported in Table 3. For example, sodium diphenylaminesulfonate was 100% effective; pyronine Y was 90-95% effective; and methylene blue was 100% effective with a tendency to increase viscosity to as much as 147%. Unstabilized controls stored in light from 50 to 130 days ranged from 3% to 62% of their original viscosities while an unstabilized control stored in darkness for 170 days retained 78%.

TABLE 3

STABILIZERS FOR CROSSLINKED PVP (K112) CROSSLINKED VIA DIALLYL POLYETHYLENE GLYCOL 600

| Example No. | Polymer Conc. % | HCl Conc. % | % Stabilizer on Wt. Polymer | Initial Viscosity Brookfield | Final Viscosity Brookfield | Duration of Test (Days/temp.) | Remarks |
|---|---|---|---|---|---|---|---|
| 55 | 3 | 5 | 0 | 55 CPS | 15 CPS | 50/ambient | Water White |
| 56 | 3 | 5 | 0.33 methylene blue | 70 CPS | 80 CPS | 155/ambient | Blue |
| 57 | 3 | 10 | 0.33 methylene blue | 80 CPS | 88 CPS | 155/ambient | |
| 58 | 5 | 5 | 0 | 142 CPS | 26 CPS | 50/ambient | |
| 59 | 5 | 5 | 0.2 methylene blue | 230 CPS | 230 CPS | 155/ambient | |
| 60 | 5 | 10 | 0.2 methylene blue | 275 CPS | 300 CPS | 155/ambient | |
| 61 | 10 | 5 | 0 | 4000 CPS | 135 CPS | 50/ambient | |
| 62 | 10 | 5 | 0.1 methylene blue | 4000 CPS | 3800 CPS | 155/ambient | |
| 63 | 10 | 10 | 0 | 3000 CPS | 1300 CPS | 130/ambient | |
| 64 | 10 | 10 | 0.1 malachite g. | 2700 CPS | 1800 CPS | 130/ambient | Orange yellow |
| 65 | 10 | 10 | 0.1 methylene blue | 3100 CPS | 4000 CPS | 155/ambient | |
| 66 | 10 | 10 | 0.1 methylene blue | 3600 CPS | 5300 CPS | 145/ambient | |
| 67 | 10 | 10 | 0 | 5000 CPS | 1200 CPS | 95/ambient | |
| 68 | 10 | 10 | 0.01 methylene blue | 4700 CPS | 4700 CPS | 95/ambient | |
| 69 | 10 | 10 | 0.02 methylene blue | 4400 CPS | 5700 CPS | 95/ambient | |
| 70 | 10 | 10 | 0.05 methylene blue | 5200 CPS | 6200 CPS | 95/ambient | |
| 71 | 10 | 10 | 0.07 methylene blue | 5000 CPS | 5200 CPS | 95/ambient | |
| 72 | 10 | 10 | 0.1 methylene blue | 5500 CPS | 6000 CPS | 95/ambient | |
| 73 | 10 | 10 | 0.1 malachite g. | 5000 CPS | 5400 CPS | 90/ambient | |
| 74 | 10 | 10 | 0.2 malachite g. | 5600 CPS | 5700 CPS | 90/ambient | |
| 75 | 10 | 10 | 0.3 malachite g. | 5800 CPS | 5600 CPS | 90/ambient | |
| 76 | 10 | 10 | 0 | 5000 CPS | 2600 CPS | 95/ambient | |
| 77 | 10 | 10 | 0.1 SDPAS | 4900 CPS | 5000 CPS | 95/ambient | Water white to light blue |
| 78 | 10 | 10 | 0.2 SDPAS | 4500 CPS | 4600 CPS | 95/ambient | |
| 79 | 10 | 10 | 0 | 4500 CPS | 2800 CPS | 90/ambient | |
| 80 | 10 | 10 | 0.1 Pyronin Y | 5000 CPS | 4500 CPS | 90/ambient | Red Hazy |
| 81 | 10 | 10 | 0.2 Pyronin Y | 5700 CPS | 5400 CPS | 90/ambient | |
| 82 | 10 | 10 | 0 | 4500 CPS | 3500 CPS | 170/ambient* | Grainy Gel |
| 83 | 10 | 10 | 0.1 methylene blue | 4700 CPS | 4300 CPS | 170/ambient* | Smooth Gel |
| 84 | 10 | 15 | 0.1 methylene blue | 5000 CPS | 5600 CPS | 145/ambient | |
| 85 | 10 | 20 | 0.1 methylene blue | 5300 CPS | 5400 CPS | 145/ambient | |
| 86 | 10 | 25 | 0.1 methylene blue | 6500 CPS | 7100 CPS | 145/ambient | |
| 87 | 12 | 10 | 0.0075 methylene blue (1) | 6000 CPS | 3400 CPS | 145/ambient | Blue Hazy |

*Stored in dark
(1) Amount of stabilizer insufficient for polymer:acid concentration. When the concentration of either polymer or acid is lowered, this amount of stabilizer should be effective.

EXAMPLES 88 THROUGH 107

Results of one year shelf life stability tests are reported in Table 4 for either 10 or 15% K 90 solutions in 0 or 10% HCl using methylene blue, malachite green (oxalate), amaranth, tartrazine, phenosafranine, sodium diphenylamine sulfonate, or pyronine Y. In 10% HCl, methylene blue, phenosafranine and pyronine Y completely stabilized the K 90 solutions for the duration of the tests. Amaranth, tartrazine and sodium diphenylamine sulfonate were about 80% effective. Malachite green showed only fair results (36%) but was very effective in K 90 solution without HCl in preventing cross-linking which resulted in a grainy appearance and vast increase in viscosity.

The stabilizers of the present invention demonstrate marked improvement over the prior art as represented by U.S. Pat. No. 2,894,921 which requires 3 to 120% of 8-hydroxyquinoline based on dry polymer to prevent drastic reduction in the viscosity of Gantrez solutions.

repeated except that samples containing methylene blue, malachite green, sodium diphenylaminesulfonate or pyronine Y were stored for at least one year at room temperatures in light. The results of this one year shelf life stability test reported in Table 5 show that at 0.1% concentration, methylene blue provided retention of 40% of the original viscosity of a 10% solution of Gantrez AN 169; sodium diphenylamine sulfonate 25% of the original viscosity, and malachite green 22% of the original viscosity as compared to 1.5 to 3.0% for the unstabilized controls. In 10% solutions of Gantrez AN 119, 0.1% of malachite green provided retention of 71%

TABLE 4

STABILIZERS FOR PVP - K-90
RESULTS OF ONE YEAR SHELF LIFE STABILITY TESTS

| Example No. | K-90 % Conc. | HCl % Conc. | % Stabilizer on Wt. Poly. | Initial Viscosity | Final Viscosity | Final Viscosity % of Original | Duration of Test (Days/temp.) | Final Color |
|---|---|---|---|---|---|---|---|---|
| 88 | 15 | 10 | 0.066 methylene blue | 7300 CPS | 4400 CPS | 60 | 405/ambient | Clear Blue |
| 89 | 15 | 10 | 0.13 methylene blue | 6800 CPS | 6200 CPS | 91 | 405/ambient | Clear Blue |
| 90 | 15 | 10 | 0.33 methylene blue | 6300 CPS | 6700 CPS | 106 | 405/ambient | Clear Blue |
| 91 | 15 | 10 | 0.46 methylene blue | 6900 CPS | 6300 CPS | 91 | 405/ambient | Clear Blue |
| 92 | 15 | 10 | 0.66 methylene blue | 7200 CPS | 6700 CPS | 93 | 405/ambient | Clear Blue |
| 93 | 15 | 10 | 0 | 6500 CPS | 2300 CPS | 35 | 405/ambient | Pale Yellow |
| 94 | 10 | 10 | 0 | 810 CPS | 90 CPS | 11 | 335/ambient | Pale Yellow |
| 95 | 10 | 10 | 0.1 Amaranth | 950 CPS | 820 CPS | 86 | 335/ambient | Clear Red |
| 96 | 10 | 10 | 0.1 Tartrazine | 960 CPS | 730 CPS | 76 | 335/ambient | Clear Yellow |
| 97 | 10 | 10 | 0.1 Phenosafranin | 990 CPS | 1000 CPS | 101 | 335/ambient | Violet |
| 98 | 10 | 10 | 0 | 800 CPS | 180 CPS | 22 | 378/ambient | Pale Yellow |
| 99 | 10 | 10 | 0.1 Pyronin Y | 800 CPS | 840 CPS | 105 | 378/ambient | Clear Red |
| 100 | 10 | 10 | 0 | 840 CPS | 180 CPS | 21 | 382/ambient | Pale Yellow |
| 101 | 10 | 10 | 0.1 Na di-phenyl Aminesulfonate | 1000 CPS | 800 CPS | 80 | 382/ambient | Pale Blue |
| 102 | 10 | 10 | 0.1 malachite g. | 910 CPS | 330 CPS | 36 | 402/ambient | Clear Amber |
| 103 | 10 | 10 | 0 | 940 CPS | 230 CPS | 24 | 402/ambient | Clear Water White |
| 104 | 10 | 0 | 0 | 640 CPS | 2000 CPS | 312 | 448/ambient | Grainy |
| 105 | 10 | 0 | 0.1 malachite g. | 640 CPS | 740 CPS | 115 | 448/ambient | Blue Smooth |
| 106 | 15 | 0 | 0 | 4000 CPS | 5000 CPS | 125 | 405/ambient* | Pale Yellow |
| 107 | 15 | 0 | 0.066 methylene blue | 6000 CPS | 6800 CPS | 113 | 405/ambient* | Blue |

*Stored in dark

EXAMPLES 108 THROUGH 131

The work up for the preparation of acidic polymer solutions which was described for Examples 1–32 were of the original viscosity and methylene blue 69% of the original viscosity as compared to 49 to 53% retention for the unstabilized controls.

TABLE 5

STABILIZERS FOR GANTREZ AN
RESULTS OF ONE YEAR SHELF LIFE STABILITY TESTS

| Example No. | Gantrez AN | Poly. Conc. | % Stabilizer on Wt. Poly. | Initial Viscosity | Final Viscosity | Final Viscosity % of Original | Duration of Test (Days/temp.) | Final Color |
|---|---|---|---|---|---|---|---|---|
| 108 | 169 | 5 | 0 | 225 CPS | 28 CPS | 12 | 425/ambient | Clear Trace Yellow |
| 109 | 169 | 5 | 0.2 malachite g. | 245 CPS | 145 CPS | 59 | 425/ambient | Clear blue |
| 110 | 169 | 10 | 0 | 2900 CPS | 80 CPS | 3 | 425/ambient | Clear yellow |
| 111 | 169 | 10 | 0.1 malachite g. | 3600 CPS | 800 CPS | 22 | 425/ambient | Clear blue |
| 112 | 119 | 10 | 0 | 49 CPS | 26 CPS | 53 | 425/ambient | Hazy yellow |
| 113 | 119 | 10 | 0.1 malachite g. | 52 CPS | 37 CPS | 71 | 425/ambient | Clear blue |
| 114 | 119 | 20 | 0 | 325 CPS | 120 CPS | 37 | 425/ambient | Hazy yellow |
| 115 | 119 | 20 | 0.05 malachite g. | 375 CPS | 200 CPS | 53 | 425/ambient | Clear Blue-Green |
| 116 | 169 | 5 | 0 | 210 CPS | 21 CPS | 10 | 420/ambient | Clear yellow |
| 117 | 169 | 5 | 0.2 methylene blue | 210 CPS | 82 CPS | 39 | 420/ambient | Clear blue |
| 118 | 169 | 10 | 0 | 2800 CPS | 90 CPS | 3 | 420/ambient | Yellow |
| 119 | 169 | 10 | 0.1 methylene blue | 3160 CPS | 1260 CPS | 40 | 420/ambient | Clear blue |
| 120 | 119 | 10 | 0 | 55 CPS | 27 CPS | 49 | 420/ambient | Yellow |
| 121 | 119 | 10 | 0.1 methylene blue | 55 CPS | 38 CPS | 69 | 420/ambient | Clear blue |
| 122 | 119 | 20 | 0 | 375 CPS | 160 CPS | 42 | 420/ambient | Hazy yellow |
| 123 | 119 | 20 | 0.05 methylene blue | 375 CPS | 195 CPS | 52 | 420/ambient | Clear blue |
| 124 | 169 | 10 | 0 | 4500 CPS | 70 CPS | 1.5 | 385/ambient | Pale yellow |
| 125 | 169 | 10 | 0.1 Na di-phenyl Aminesulfonate | 4900 CPS | 1240 CPS | 25 | 385/ambient | Straw |
| 126 | 169 | 10 | 0.2 Na di-phenyl Aminesulfonate | 4200 CPS | 1160 CPS | 27 | 385/ambient | Clear yellow-green |
| 127 | 169 | 5 | 0 | 250 CPS | 20 CPS | 8 | 380/ambient | Pale yellow |
| 128 | 169 | 5 | 0.2 Pyronin Y | 240 CPS | 25 CPS | 10 | 380/ambient | Hazy red |
| 129 | 169 | 10 | 0 | 4300 CPS | 70 CPS | 1.6 | 380/ambient | Pale yellow |
| 130 | 169 | 10 | 0.1 Pyronin Y | 3800 CPS | 155 CPS | 4 | 380/ambient | Hazy red |

TABLE 5-continued

STABILIZERS FOR GANTREZ AN
RESULTS OF ONE YEAR SHELF LIFE STABILITY TESTS

| Example No. | Gantrez AN | Poly. Conc. | % Stabilizer on Wt. Poly. | Initial Viscosity | Final Viscosity | Final Viscosity % of Original | Duration of Test (Days/temp.) | Final Color |
|---|---|---|---|---|---|---|---|---|
| 131 | 169 | 10 | 0.2 Pyronin Y | 3900 CPS | 140 CPS | 3.5 | 380/ambient | Hazy red |

EXAMPLES 132 THROUGH 157

TABLE 6

STABILIZERS FOR CROSSLINKED PVP[1] K112
RESULTS OF ONE YEAR SHELF LIFE STABILITY TESTS

| Example No. | Poly Conc. | HCl Conc. | % Stabilizer on Wt. Poly. | Initial Viscosity | Final Viscosity | Final Viscosity % of Original | Duration of Test (Days/temp.) | Final Color |
|---|---|---|---|---|---|---|---|---|
| 132 | 10 | 10 | 0.1 malachite g. | 2700 CPS | 620 CPS | 23 | 445/ambient | Orange |
| 133 | 10 | 10 | 0 | 3000 CPS | 140 CPS | 5 | 445/ambient | Pale Yellow |
| 134 | 10 | 10 | 0.01 methylene blue | 4700 CPS | 2800 CPS | 59 | 420/ambient | Pale Blue |
| 135 | 10 | 10 | 0.02 methylene blue | 4400 CPS | 5000 CPS | 113 | 420/ambient | Blue |
| 136 | 10 | 10 | 0.05 methylene blue | 5200 CPS | 5800 CPS | 111 | 420/ambient | Dark Blue |
| 137 | 10 | 10 | 0.07 methylene blue | 5000 CPS | 6000 CPS | 120 | 420/ambient | Dark Blue |
| 138 | 10 | 10 | 0.1 methylene blue | 5500 CPS | 6100 CPS | 110 | 420/ambient | Dark Blue |
| 139 | 10 | 10 | 0 | 5000 CPS | 260 CPS | 5 | 420/ambient | Pale Yellow |
| 140 | 3 | 5 | 0.33 methylene blue | 70 CPS | 75 CPS | 107 | 425/ambient | Blue |
| 141 | 5 | 5 | 0.2 methylene blue | 230 CPS | 252 CPS | 109 | 425/ambient | Blue |
| 142 | 10 | 5 | 0.1 methylene blue | 4000 CPS | 4500 CPS | 112 | 425/ambient | Blue |
| 143 | 3 | 10 | 0.33 methylene blue | 80 CPS | 76 CPS | 95 | 425/ambient | Blue |
| 144 | 5 | 10 | 0.2 methylene blue | 275 CPS | 285 CPS | 103 | 425/ambient | Blue |
| 145 | 10 | 10 | 0.1 methylene blue | 4100 CPS | 6400 CPS | 156 | 425/ambient | Blue |
| 146 | 10 | 5 | 0 | 4000 CPS | 135 CPS | 3 | 50/ambient | Pale Yellow |
| 147 | 10 | 10 | 0.1 malachite g. | 5000 CPS | 2000 CPS | 40 | 410/ambient | Pale Orange |
| 148 | 10 | 10 | 0.2 malachite g. | 5600 CPS | 2500 CPS | 44 | 410/ambient | Orange |
| 149 | 10 | 10 | 0.3 malachite g. | 5800 CPS | 3700 CPS | 64 | 410/ambient | Orange |
| 150 | 10 | 10 | 0 | 5000 CPS | 340 CPS | 7 | 390/ambient | Pale Yellow |
| 151 | 10 | 10 | 0.1 SDPAS[2] | 4900 CPS | 5100 CPS | 104 | 390/ambient | Pale Blue-Green |
| 152 | 10 | 10 | 0.2 SDPAS[2] | 4500 CPS | 4900 CPS | 109 | 390/ambient | Blue-Green |
| 153 | 10 | 10 | 0 | 4500 CPS | 340 CPS | 7.5 | 385/ambient | Pale Yellow |
| 154 | 10 | 10 | 0.1 Pyronin Y | 5000 CPS | 5000 CPS | 100 | 385/ambient | Red |
| 155 | 10 | 10 | 0.2 Pyronin Y | 5700 CPS | 5400 CPS | 95 | 385/ambient | Red |
| 156 | 10 | 10 | 0.1 methylene blue | 4700 CPS | 4200 CPS | 89 | 410/ambient* | Blue |
| 157 | 10 | 10 | 0 | 4500 CPS | 3300 CPS | 73 | 410/ambient* | Pale Yellow |

[1]Vinylpyrrolidone crosslinked with diallyl polyethylene glycol 600
[2]SDPAS = Sodium Diphenylamine sulfonate
*Stored in dark Stabilizers for the cross-linked polymer of Examples 55–87 were tested for one year shelf life stability of the thickened acid solution. The polymer solution was prepared by mixing the stabilizer and polymer in the HCl aqueous solution in the concentration shown in Table 6.

The results of the one year shelf life study show that sodium diphenylaminesulfonate and pyronine Y were 100% effective in maintaining the initial viscosity for over one year. Methylene blue results indicate a slight increase in viscosity. Unstabilized controls stored in light retained only 3 to 7% of their original viscosities but an unstabilized control stored in darkness retained 73%, indicating that light accelerates the deterioration with the system.

EXAMPLES 158 THROUGH 206

The data presented in Table 7 provides a guide to color changes in the stabilized acid solutions of polymer which may be expected when a decline in viscosity due to oxidation occurs.

Additionally the Redox Potential of methylene blue, phenosafranine and sodium diphenylamine sulfonate is provided, as a guide for color change in the oxidized form.

The normal redox potential for methylene blue at various pH's is given as +0.101 (pH 5.0), +0.011 (pH 7.0) and −0.050 (pH 9.0) (Chemical Indicators-Tomicek).

TABLE 7

| Example No. | Indicator | Redox Potential at pH 0[a] | Color of Oxidized Form in $H_2O$ | Color of Reduced Form in $H_2O$ | Initial Color in Solution of PVP + HCl | Initial Color in Hydrolyzed Gantrez AN Solution with HCl |
|---|---|---|---|---|---|---|
| 158 | Phenosafranine | 0.28 volts | Red | Colorless | Violet | Violet |
| 159 | Methylene Blue | 0.53 volts | Blue | Colorless | Blue | Blue |
| 160 | Sodium Diphenylamine sulfonate | 0.84 volts | Violet-Red | Colorless | Pale Pink | Pale Yellow |
| 161 | Amaranth | — | Colorless | Red | Red | Red |
| 162 | Tartrazine | — | Colorless | Yellow | Yellow | Yellow |
| 163 | Malachite Green | — | Blue-Green | Colorless | Blue-Green | Blue-Green |
| 164 | Pyronin Y | — | — | — | Red | Red |
| 165 | Neutral Red | 0.20[b] volts | Red-Violet | Colorless | | |
| 166 | Gallocyanine | 0.02 volts | Violet-Blue | Colorless | | |
| 167 | Safranine T | 0.24 volts | Blue-Violet | Colorless | | |
| 168 | Dimethylglyoxime[c] | 0.25[d] volts | Colorless | Red | | |
| 169 | 5,5'-Indigodisulfonic Acid, | 0.29 volts | Blue | Colorless | | |

TABLE 7-continued

| Example No. | Indicator | Redox Potential at pH O[a] | Color of Oxidized Form in H$_2$O | Color of Reduced Form in H$_2$O | Initial Color in Solution of PVP + HCl | Initial Color in Hydrolyzed Gantrez AN Solution with HCl |
|---|---|---|---|---|---|---|
| 170 | Nile Blue A (Sulfate) Disodium Salt | 0.41 volts | Blue | Colorless | | |
| 172 | Thionin(e) | 0.56 volts | Violet | Colorless | | |
| 173 | Brilliant Cresyl Blue | 0.58 volts | Blue | Colorless | | |
| 174 | 2,6-Dichloroindophenol, Sodium Derivative | 0.67 volts | Red | Colorless | | |
| 175 | N$^1$—Phenyl-1,2,4-benzene-triamine | 0.70 volts | Red | Colorless | | |
| 176 | Variamine Blue B Hydrochloride | 0.71 volts | Blue | Colorless | | |
| 177 | 2,2-Bipyridine[c] | 0.97 volts | Blue | Red | | |
| 178 | 2',2'-Bipyridine Monohydrochloride[c] | 0.97 volts | Blue | Red | | |
| 179 | 2,2'-Bipyridine, Iron (II) Derivative, Perchlorate | 0.97 volts | Blue | Red | | |
| 180 | 5,6-Dimethyl-1,10-phenanthroline | 0.97 volts | Pale Blue | Red | | |
| 181 | Erioglaucine (A) | 1.00 volts | Pink | Green | | |
| 182 | Xylene Cyanole FF | 1.00 volts | Pink | Yellow-Green | | |
| 183 | Setoglaucine O | 1.01 volts | Yellow-Red | Yellow-Green | | |
| 184 | 5-Methyl-1,10-phenanthroline[c] | 1.06 volts | Pale Blue | Red | | |
| 185 | 5-Methyl-1,10-phenanthroline, Iron (II) Derivative, Perchlorate | 1.06 volts | Pale Blue | Red | | |
| 186 | N—Phenylanthranilic Acid | 1.08 volts | Violet-Red | Colorless | | |
| 187 | Setopaline | 1.10 volts | Orange | Yellow | | |
| 188 | 1,10-Phenanthroline[c] | 1.14 volts | Pale Blue | Dark Red | | |
| 189 | 1,10-Phenanthroline Monohydrochloride[c] | 1.14 volts | Pale Blue | Dark Red | | |
| 190 | 2,2'-Bipyridine, Ruthenium-(II) Derivative, Chloride | 1.25 volts | Colorless | Yellow | | |
| 191 | N,N—Dimethyl-p-phenylenediamine | 0.76 volts | Red | Colorless | | |
| 192 | Diphenylamine | 0.76 volts | Violet | Colorless | | |
| 193 | N,N—Diphenylbenzidine | 0.76 volts | Violet | Colorless | | |
| 194 | 3,3'-Dimethoxybenzidine | 0.76 volts | Red | Colorless | | |
| 195 | 3,3'-Dimethoxybenzidine Dihydrochloride | 0.76 volts | Red | Colorless | | |
| 196 | Barium Diphenylaminesulfonate | 0.84 volts | Violet-Red | Colorless | | |
| 197 | 3,4,7,8-Tetramethyl-1,10-phenanthroline[c] | 0.85 volts | Pale Blue | Red | | |
| 198 | 3,4,7,8-Tetramethyl-1,10-phenanthroline, Iron (II) Derivative, Sulfate | 0.85 volts | Pale Blue | Red | | |
| 199 | 4,7-Dimethyl-1,10-phenanthroline[c] | 0.87 volts | Pale Blue | Red | | |
| 200 | o-Tolidine | 0.87 volts | Blue | Colorless | | |
| 201 | Benzidine Dihydrochloride | 0.92 volts | Blue | Colorless | | |
| 202 | 5-Nitro-1,10-phenanthroline[c] | 1.25 volts | Pale Blue | Red | | |
| 203 | 2,2':6',2''-Terpyridine[c] | 1.25 volts | Pale Blue | Red | | |
| 204 | Brucine | — | Red | Colorless | | |
| 205 | Cacotheline | — | Yellow | Red-Violet | | |
| 206 | Methyl Red Hydrochloride[g] | — | Orange | Violet or Yellow | | |

[a] Vs. normal hydrogen electrode
[b] At pH 5
[c] Fe (II) present
[d] At pH 9.4
[f] Irreversible The Redox indicators of the present invention have been found to aid in stabilizing acidic solutions of PVP or Gantrez AN. They retard oxidation of these polymers which results in chain scission with a decrease in viscosity or cross-linking with increased viscosity, both of which were observed in the tests conducted.

It is to be understood that any of the aforereferenced polymers can be substituted in the above examples employing the present Redox indicators for improved stability over extended periods.

What is claimed is:

1. A mucilage composition having a pH less than 7 containing between about 0.5 and about 25 weight % of a vinyl polymer thickener having a K value of between about 10 and about 250 and between about 0.005 and about 1 weight %, based on polymer, of a redox indicator having from 6 to 30 carbon atoms and containing at least one radical selected from the group consisting of amino, cyano and azo, to stabilize said polymer against acidic degradation.

2. A stabilized mucilage containing the composition of claim 1 and between about 5 and about 25 weight % acid to provide an acidic solution having a pH of from about 0.1 to less than 7.

3. The composition of claim 1 wherein the redox indicator is present in an amount between about 0.05 and about 0.75 weight %, based on polymer.

4. The composition of claim 1 wherein the stabilizer for polymers in acidic media is selected from the group consisting of methylene blue; methyl red, orange or green; pyronine Y; phenosafranine; tartrazine; amaranth; malachite green oxalate; basic blue; neutral red and an alkali metal salt of diphenylamine sulfonate.

5. The composition of claim 1 wherein said polymer is poly-N-vinyl-2-pyrrolidone.

6. The composition of claim 1 wherein said polymer is a copolymer of vinyl alkyl ether and maleic acid.

7. The composition of claim 1 wherein said polymer is a copolymer of vinyl alkyl ether and maleic anhydride.

8. The composition of claim 2 in which said polymer is an interpolymer of methyl vinyl ether and maleic anhydride.

9. The composition of claim 2 in which said polymer is poly-N-vinyl-2-pyrrolidone cross-linked with diallyl polyethylene glycol.

10. The composition of claim 2 in which said polymer is a polymer of alkyl vinyl ether wherein said alkyl contains from 1 to 2 carbon atoms.

11. The composition of claim 4 in which said indicator is methylene blue.

12. The composition of claim 4 in which said indicator is phenosafranine.

13. The composition of claim 4 in which said indicator is malachite green.

14. The composition of claim 4 in which said indicator is amaranth.

15. The composition of claim 4 in which said indicator is sodium diphenylamine sulfonate.

16. The composition of claim 4 in which said solution is an aqueous solution containing from 0.5 to 25 percent of a mineral acid.

17. The composition of claim 16 in which said acid is hydrogen chloride.

18. The composition of claim 16 in which said acid is phosphoric acid.

19. The composition of claim 2 comprising between about 0.5 and about 25% by weight of poly-N-vinyl-2-pyrrolidone in an acidic aqueous solution containing between about 0.05 and about 0.75 weight % based on polymer of methylene blue.

* * * * *